(12) United States Patent
Marshall et al.

(10) Patent No.: US 9,784,365 B2
(45) Date of Patent: Oct. 10, 2017

(54) VARIABLE VANE ACTUATING SYSTEM

(71) Applicant: Pratt & Whitney Canada Corp., Longueuil (CA)

(72) Inventors: Andrew Marshall, Grand Valley (CA); Gilles Durocher, Boucherville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 870 days.

(21) Appl. No.: 14/161,786

(22) Filed: Jan. 23, 2014

(65) Prior Publication Data

US 2015/0204439 A1    Jul. 23, 2015

(51) Int. Cl.

| F16H 57/12 | (2006.01) |
| F16H 37/04 | (2006.01) |
| F04D 29/64 | (2006.01) |
| F01D 17/16 | (2006.01) |
| F04D 27/02 | (2006.01) |
| F04D 29/56 | (2006.01) |

(52) U.S. Cl.
CPC ........... *F16H 57/12* (2013.01); *F01D 17/162* (2013.01); *F01D 17/165* (2013.01); *F04D 27/0246* (2013.01); *F04D 29/563* (2013.01); *F04D 29/644* (2013.01); *F16H 37/04* (2013.01); *F05D 2250/90* (2013.01); *F05D 2260/4031* (2013.01); *F05D 2260/53* (2013.01); *Y10T 29/4932* (2015.01)

(58) Field of Classification Search
CPC .. F01D 17/162; F01D 17/165; F04D 27/0246; F04D 29/563; F05D 2260/4031; F05D 2250/90

USPC .......................................................... 415/160
See application file for complete search history.

(56) References Cited

U.S. PATENT DOCUMENTS

| 3,013,771 | A | * | 12/1961 | Henny | .................. | F01D 17/162 |
| | | | | | | 415/149.1 |
| 3,632,224 | A | | 1/1972 | Wright et al. | | |
| 3,999,883 | A | * | 12/1976 | Nordenson | ........... | F01D 17/162 |
| | | | | | | 415/113 |
| 5,620,301 | A | | 4/1997 | Lawer | | |
| 5,630,701 | A | | 5/1997 | Lawer | | |

(Continued)

FOREIGN PATENT DOCUMENTS

| EP | 1746258 | 1/2007 |
| GB | 138592 | 5/1920 |
| GB | 1505858 | 3/1978 |

*Primary Examiner* — Mark Laurenzi
*Assistant Examiner* — Wesley Harris
(74) *Attorney, Agent, or Firm* — Norton Rose Fulbright Canada (57) ABSTRACT

A variable vane assembly for a gas turbine engine having an actuating system including a rotatable face gear and a respective pinion engaged to and extending transversely from the end of each of the moveable vanes. The teeth of each pinion define land surfaces angled with respect to adjacent ones of the land surfaces of the teeth of the face gear meshed therewith. A smallest axial distance between the adjacent land surfaces of the meshed pinion and face gear teeth define a backlash of the actuating system. At least one shim has a thickness adjusting an axial distance between the pinion and the face gear to set the backlash to a predetermined value. An engine with a compressor with a variable vane assembly and a method of adjusting angular variance in an actuating system for variable vanes are also discussed.

19 Claims, 4 Drawing Sheets

(56) References Cited

U.S. PATENT DOCUMENTS

| | | |
|---|---|---|
| 6,928,818 B1 | 8/2005 | Arnold et al. |
| 7,665,959 B2 | 2/2010 | Giaimo et al. |
| 2012/0308364 A1 | 12/2012 | Hofmann |

* cited by examiner

VARIABLE VANE ACTUATING SYSTEM

TECHNICAL FIELD

The application relates generally to variable vanes in a gas turbine engine and, more particularly, to actuating systems for such vanes.

BACKGROUND OF THE ART

Variable inlet guide vanes for gas turbine engine compressors may be actuated using a spur ring gear meshed with spur pinions. Such arrangements typically require the vanes to be pivotable about an axis parallel to the rotational axis of the ring gear. Other arrangements are known for vanes pivotable about a radial axis. In existing gear actuating systems, backlash and angle accuracy is typically solely determined by the manufacturing tolerances of the system's components, and accordingly the backlash may be relatively high and/or possible adjustment of the backlash may be limited.

SUMMARY

In one aspect, there is provided a gas turbine engine comprising: a compressor in a flow path, the compressor including moveable inlet guide vanes; and an actuating system drivingly connected to the moveable inlet guide vanes, the system including: a face gear located out of the flow path and rotationally engaged to a central support having a fixed position with respect to the compressor, the face gear rotatable about a central axis of the compressor, a radial or substantially radial surface of the face gear defining circumferentially spaced teeth each defining land surfaces, a pinion engaged to and extending transversely from an end of each of the vanes, each pinion having an array of involute gear teeth spaced apart from the vane end, each pinion in meshed engagement with the face gear, the teeth of each pinion defining land surfaces angled with respect to adjacent ones of the land surfaces of the teeth of the face gear meshed therewith, a smallest axial distance between the adjacent land surfaces of the meshed pinion and face gear teeth defining a backlash of the actuating system, and at least one shim abutting the pinion or the face gear and having a thickness adjusting an axial distance between the pinion and the face gear to set the backlash to a predetermined value.

In another aspect, there is provided a variable vane assembly for a gas turbine engine, the assembly comprising: an array of circumferentially spaced apart vanes adapted to extend across an annular flow path, each of the vanes pivotable about a pivot axis extending along a longitudinal direction of the vane, the vanes each having a pivot end, the array defining a central longitudinal axis; and an actuating system including: a bearing assembly concentric with the array and axially spaced apart therefrom, the bearing assembly having a fixed position with respect to the array, a face gear engaged to the bearing assembly and rotatable about the central longitudinal axis, the face gear having circumferentially spaced teeth defining land surfaces extending within a corresponding plane perpendicular to the central longitudinal axis, a pinion engaged to and extending transversely from the pivot end of each of the vanes, each pinion having an array of involute gear teeth spaced apart from the pivot end, each pinion in meshed engagement with the face gear, the teeth of each pinion defining land surfaces angled with respect to adjacent ones of the land surfaces of the teeth of the face gear meshed therewith, a smallest axial distance between the adjacent land surfaces of the meshed pinion and face gear teeth defining a backlash of the actuating system, and at least one shim abutting the pinion or the face gear and having a thickness adjusting an axial distance between the pinion and the face gear to set the backlash to a predetermined value.

In a further aspect, there is provided a method of adjusting angular variance in an actuating system for variable vanes, the method comprising: meshing teeth of a respective pinion extending from each of the vanes with teeth defined in a radial or substantially radial surface of a face gear, the meshed pinion teeth and face gear teeth defining respective land surfaces angled with respect to one another; selecting a predetermined value for a backlash between the face gear and each pinion; and adjusting the backlash by adjusting an axial distance between the pinion and the face gear.

DESCRIPTION OF THE DRAWINGS

Reference is now made to the accompanying figures in which.

DETAILED DESCRIPTION

Figure 1:
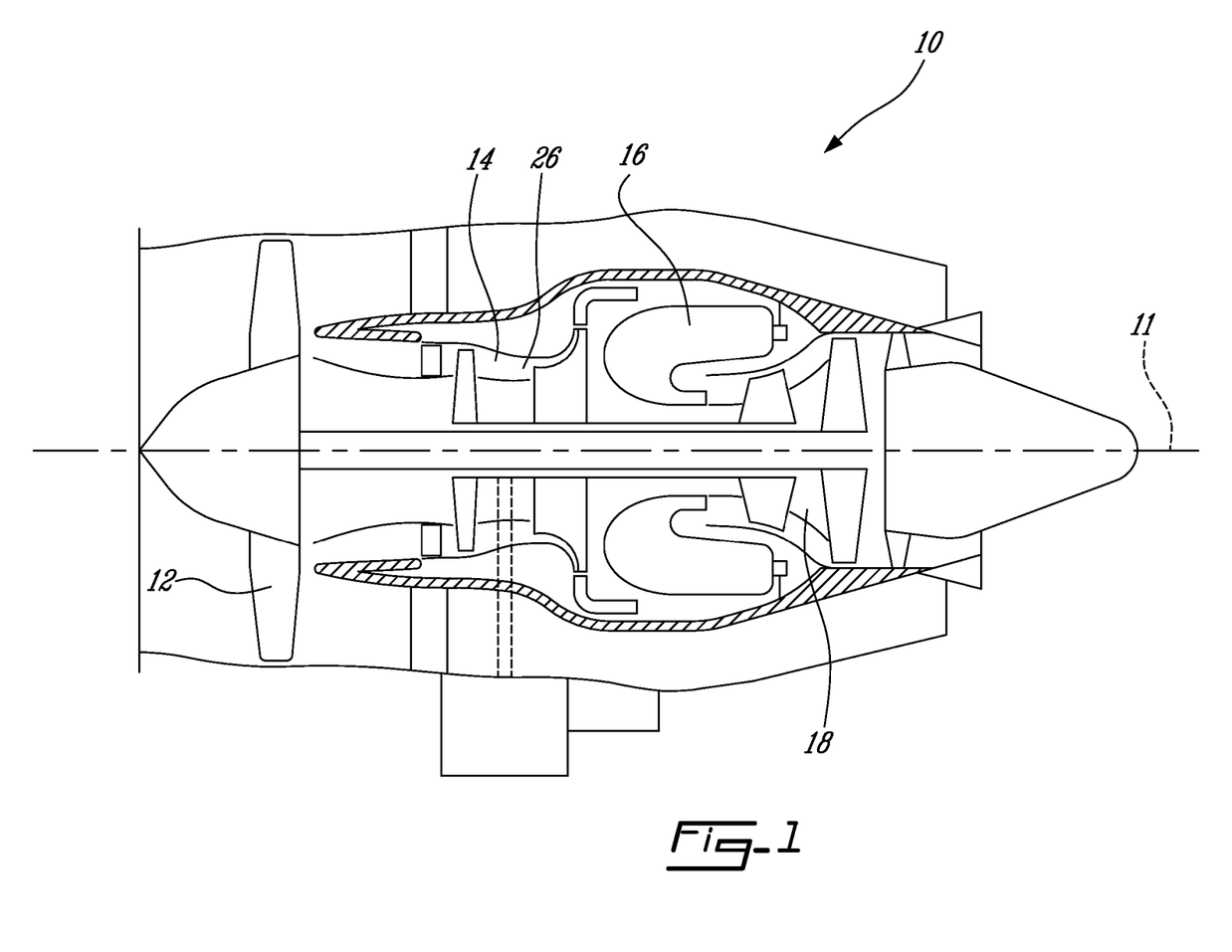
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although the engine 10 is shown here as a turbofan engine, it is understood that the engine may alternately be any other type of gas turbine engine, including a turboprop and turboshaft engines.

Figure 2:
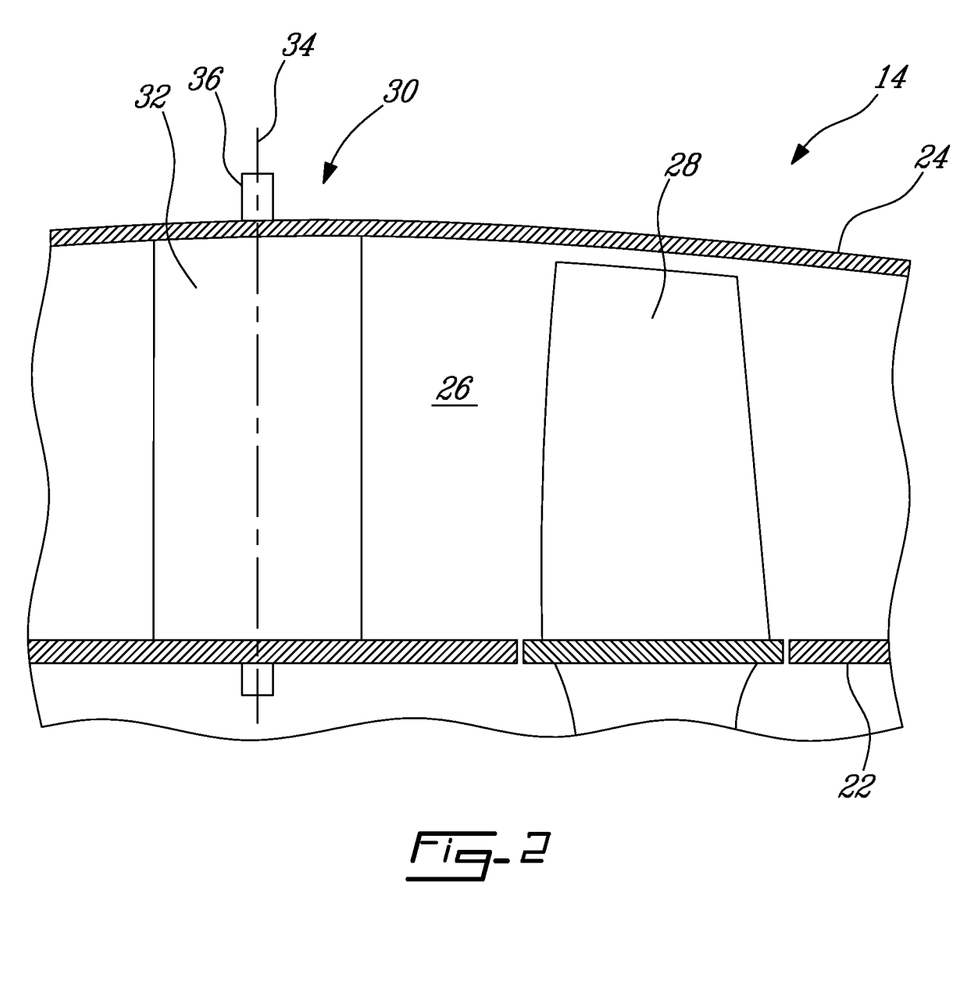
FIG. 2 is a schematic cross-sectional view of part of a compressor section of a gas turbine engine such as shown in FIG. 1.

Referring to FIG. 2, the compressor section 14 generally includes concentric inner and outer walls 22, 24 defining an annular flow path 26 therebetween, across which the circumferentially spaced apart rotatable blades 28 of the compressor rotor(s) extend. Although the Figure shows a single rotor, it is understood that the compressor section may include multiple rotors. The compressor section includes a variable inlet guide vane assembly 30 located upstream of the compressor rotor. Although the Figure shows a single array of variable inlet guide vanes 32, it is understood that the compressor section 14 may include multiple arrays of variable inlet guide vanes each positioned upstream of a respective one of the compressor rotors, with variable inlet guide vanes being provided for only some (for example, the first three) of the rotors or for all of the rotors of the compressor section.

Figure 3:
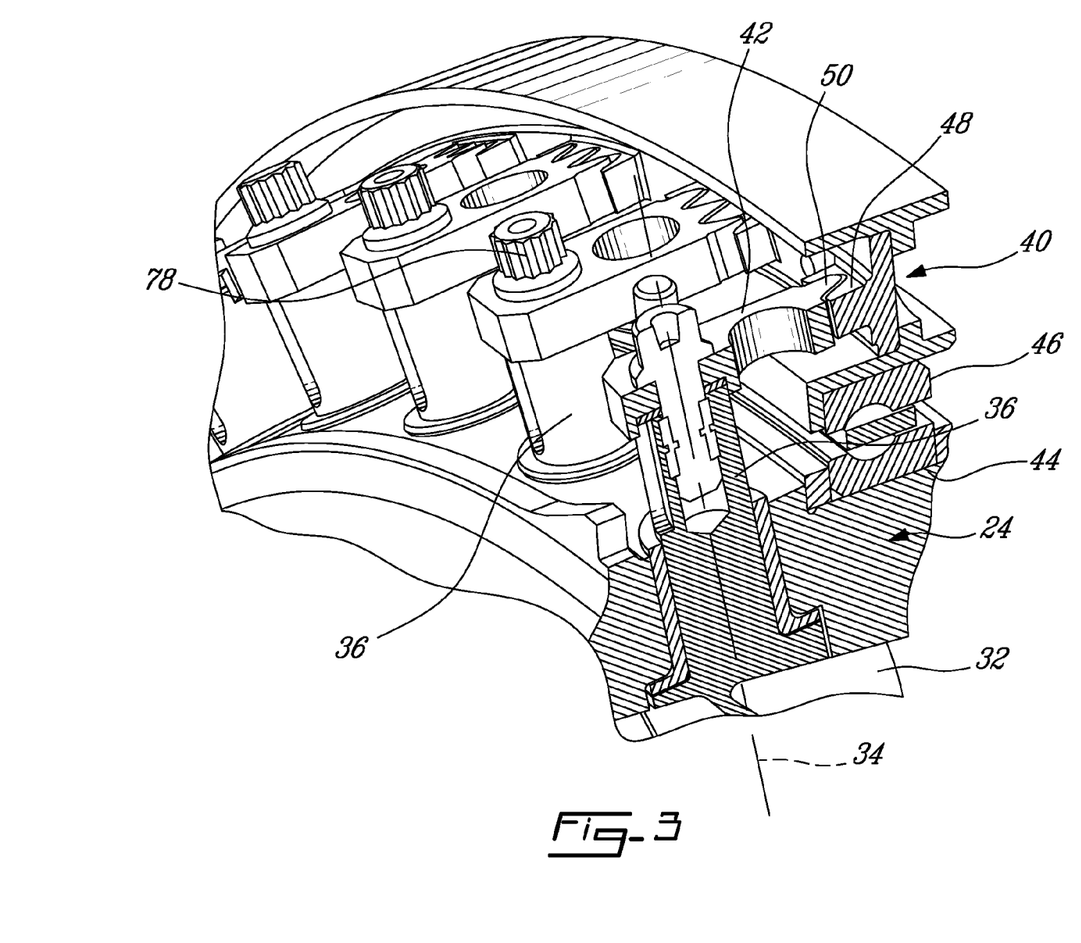
FIG. 3 is a schematic tridimensional view of an actuating system for variable inlet guide vanes of the compressor section of FIG. 2, in accordance with a particular embodiment.

Referring to FIGS. 2-3, each assembly 30 generally includes an array of circumferentially spaced apart inlet guide vanes 32 which extend across the flow path 26, and an actuating system. Each of the vanes 32 is pivotable about a respective pivot axis 34 which extends along a longitudinal direction of the vane 32. Each vane 32 has a pivot end 36 through which the pivot axis 34 extends, located out of the flow path 26 and connected to the remainder of the vane 32 through one of the walls; in the embodiment shown, the pivot end 36 extends radially outwardly through the outer wall 24.

Referring more particularly to FIG. 3, the actuating system generally includes a face gear 40 and a pinion 42 for each of the vanes 32. The face gear 40 is located out of the flow path 26, and in the embodiment shown is provided in the form of a ring gear extending around the outer wall 24. The face gear 40 is rotationally engaged to a central support 44 having a fixed position with respect to the walls 22, 24. In the embodiment shown, the central support 44 is provided as an integral part of the outer wall 24, and the face gear 40 is rotationally engaged to the support 44 through a bearing assembly 46. In a particular embodiment, the bearing assembly 46 has a zero radial clearance, and includes for example a ball bearing to which a preload has been applied such that the radial dimension of the bearing remains constant upon application of a load thereon, to minimize, and in a particular embodiment eliminate, variation in the radial position of the face gear 40 during use. The face gear 40 is rotatable about a central axis which corresponds to the central axis 11 (FIG. 1) of the compressor section 14 and of the engine 10.

A radial or substantially radial surface of the face gear 40 defines circumferentially spaced teeth 48. In the embodiment shown, the teeth 48 are provided in circumferentially spaced apart groups, with each group being associated with one of the pinions 42. Alternately, the teeth 48 may be defined in a continuous manner around the face gear 40. In a particular embodiment, the face gear 40 is a helical gear. In a particular embodiment, the use of a helical gear may provide for a higher contact ratio and/or provide for a reduction in noise during use with respect to a straight face gear.

Figure 4:
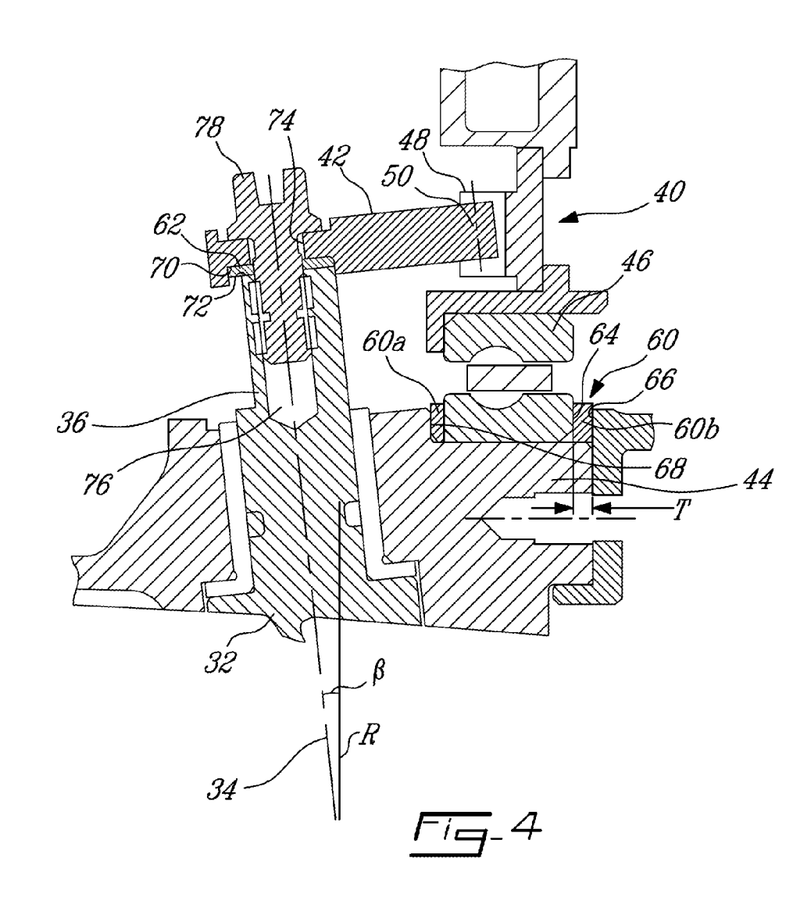
FIG. 4 is a schematic cross-sectional view of the actuating system of FIG. 3.

Referring to FIGS. 3-4, each pinion 42 is engaged to the pivot end 36 of the respective vane 32, such as to rotate together therewith about the pivot axis 34. In a particular embodiment, the pinion 42 and pivot end 36 are engaged through a rigid engagement. The pinion 42 extends transversely from the pivot end 36, and in the embodiment shown extends perpendicularly to the pivot axis 34. Each pinion 42 defines an array of involute gear teeth 50 spaced apart from the pivot end 36, in meshed engagement with the teeth 48 of the face gear 40. In a particular embodiment, each pinion 42 is a spur gear.

Figure 5A:
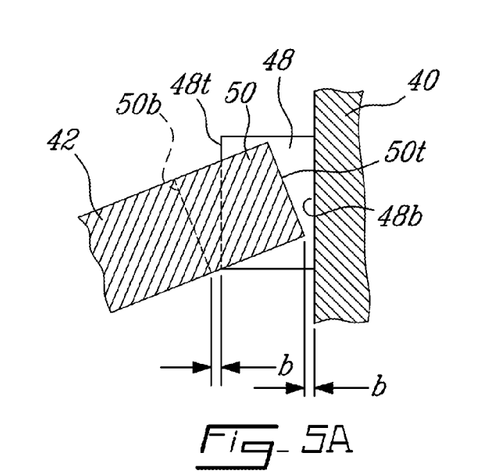
FIG. 5a is a cross-sectional view of meshed teeth of the pinion and face gear of the actuating system of FIG. 3, illustrating a backlash of the system.
Figure 5B:
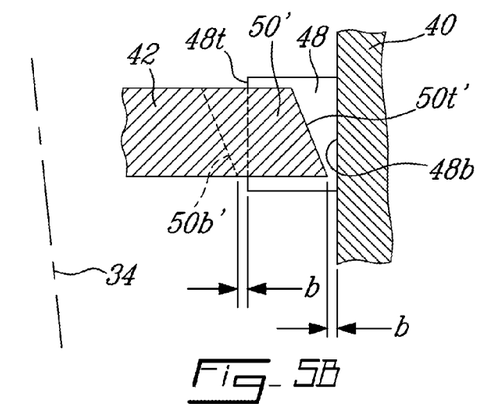
FIG. 5b is a cross-sectional view of meshed teeth of a pinion and face gear of an actuating system in accordance with another embodiment, illustrating a backlash of the system.

As can be seen more clearly in FIGS. 5a-5b, the teeth 50 of the pinion 42 and the teeth 48 of the face gear 40 each define respective top and bottom land surfaces, with, for the meshed teeth, the bottom land surfaces 50b, 50b' of the pinion teeth 50, 50' extending in close proximity to the top land surfaces 48t of the face gear teeth 48 and the top land surfaces 50t, 50t' of the pinion gear teeth 50, 50' extending in close proximity to the bottom land surfaces 48b of the face gear teeth 48. It can be seen that the pinion land surfaces 50b, 50t, 50b', 50t' are angled (i.e. extend at a non-zero angle) with respect to the adjacent face gear land surfaces 48t, 48b.

In the embodiments shown, the face gear land surfaces 48b, 48t extend within a corresponding plane perpendicular to the central axis 11 of the compressor, i.e. the face gear land surfaces 48b, 48t have a radial or substantially radial orientation. In the embodiment of FIGS. 4-5a, the pivot axis 34 of each vane 32 extends at a non-zero angle β with respect to the radial direction R of the compressor when viewed in a plane containing the pivot axis 34 and the central axis 11 of the compressor (plane of FIG. 4). In a particular embodiment, the angle β is 15 degrees or less, and preferably 13 degrees or less. Accordingly, the vanes 32 are tilted with respect to the backward/forward direction. In a particular embodiment, the pivot axis 34 of the vanes 32 and the land surfaces 50b, 50t of the respective pinion 42 are parallel; the angle between the pinion land surfaces 50b, 50t and the adjacent face gear land surfaces 48t, 48b is thus a result of the pivot axis angle β.

In the embodiment of FIG. 5b, the teeth 50' of each pinion 42 are tapered to create or contribute to the angle between the pinion land surfaces 50b', 50t' and the adjacent face gear land surfaces 48t, 48b. In a particular embodiment, the pivot axis 34 of the vane 32 and the land surfaces 50b', 50t' of the respective pinion 32 are non-parallel. The pivot axis 34 may extend along the radial direction R of the compressor, or may be angled with respect thereto.

In another embodiment, the face gear land surfaces are angled (i.e. extend at a non-zero angle) with respect to the radial orientation to create or contribute to the angle between the pinion land surfaces and the adjacent face gear land surfaces.

A smallest distance between the adjacent land surfaces of the meshed pinion and face gear teeth 48, 50/50' define a backlash b of the actuating system. The backlash b is the effective gap between the meshed teeth 48, 50/50', which affects the positional accuracy of the actuating system; as this gap must be closed upon a change of direction of the gears, minimization of the backlash b allows in a particular embodiment to reduce the error in motion of the actuating system. The backlash b is thus set to a predetermined value which may allow for a desired positional accuracy, taking into account the conditions of use of the system. In a particular embodiment, the backlash b is selected such as to correspond to or produce a gap as close to 0 as possible at a maximum temperature experienced by the vanes 32 during use of the compressor section 14. Taking into account the different materials of the vane assembly 30 (for example, in a particular embodiment, the face gear 40 is made of titanium or aluminium and the remainder of the vane assembly, including the pinions 42, is made of steel), the direction and scale of the thermal growth occurring between the manufacturing temperature and the maximum temperature is computed. The predetermined value of the backlash b at manufacturing temperature is computed by adding the variation due to thermal growth between the manufacturing temperature and the maximum temperature to the selected gap value for the maximum temperature. It is understood that the selected gap value for the maximum temperature value may vary. In a particular embodiment, the value is selected based on machining tolerances. For example, the pinion and face gear teeth 48, 50/50' may be ground with a precision of from 0.0001 inch to 0.0002 inch with respect to repeatability and accuracy, and accordingly the selected gap value at the maximum temperature value may be selected to be 0.0002 inch. It is understood that the value provided is an example only.

Referring back to FIG. 4, the actuating system includes at least one shim adjusting the relative position of the pinions 42 and the face gear 40 to set the backlash b to the predetermined value. A face gear shim 60 and/or pinion shim(s) 62 may be provided. FIG. 4 shows the use of both types of shims, although it is understood that alternately only one type may be provided.

The face gear shim 60 extends between and in abutment with a radially extending surface 64 of the bearing assembly 46 and a radially extending surface 66 of the central support 44. In the embodiment shown, the bearing assembly 46 is received between the radial surfaces 66, 68 of two spaced apart flanges of the central portion 44 being part of the casing of the engine 10 which defines the outer wall 24, and the radial surfaces 66, 68 have a fixed distance therebetween. The face gear shim 60 is provided in two annular portions, a front portion 60a located between the front radial surface 68 and the bearing assembly 46, and a rear portion 60b located between the rear radial surface 66 and the bearing assembly 46. The thickness T of the rear shim portion 60b is adjusted to obtain a desired axial position of the face gear 40, and the thickness of the front shim portion 60a is adjusted to complement the thickness of the rear shim portion 60b such that the two portions 60a, 60b cooperate to prevent axial movement of the bearing assembly 46 between the radial surfaces 66, 68 of the casing. By affecting the axial position of the face gear 40, sizing of the thickness of the face gear shim 60 thus allows for or contributes to the backlash b to be set to the predetermined value. The sizing of the thickness of the face gear shim 60 thus provides for a global adjustment of the backlash b for all pinions 42.

The pinion shim(s) 62 may include a pinion shim 62 for one or more of the pinions 42. Each pinion shim 62 extends between and in abutment with a surface 70 of the pinion 42 and a surface 72 of the vane 32 which both extend perpendicularly to the pivot axis 34. In the embodiment shown, the pinion 42 has a hole 74 defined therethrough in alignment with a hole 76 defined in the pivot end 36 of the vane 32, and the pinion 42 is attached to the pivot end 36 by a fastener 78 received in the aligned holes 74, 76. The pinion shim 62 is annular and extends around the fastener 78 between the pivot end 36 and the pinion 42. The thickness of the pinion shim 62 thus determines a position of the pinion 42 along the pivot axis 34 of the vane 32. Because of the angle between the pinion land surfaces 50b, 50t, 50b', 50t' and the adjacent face gear land surfaces 48t, 48b, movement of the pinion 42 along the pivot axis 34 changes the relative axial position of the closest points of the land surfaces, and accordingly, the backlash b. The sizing of the thickness of the pinion shim 62 thus provides for an adjustment of the backlash b for this particular pinion 42. In a particular embodiment, a pinion shim 62 is provided on only selected ones of the pinions 42. Alternately, a pinion shim 62 may be provided on all pinions 42.

In use, the adjusting angular variance in the actuating system is thus adjusted by selecting the predetermined value for the backlash b between the face gear 40 and each pinion 42, and adjusting the backlash b by adjusting the axial distance between the pinion 42 and the face gear 40. As detailed above, the axial distance may be adjusted through the face gear shim 60 and/or pinion shim(s) 62. Accordingly, adjusting the axial distance may include adjusting the relative position of the pinion 42 with respect to the vane 32 along the pivot axis 34, through adjustment of the thickness of the pinion shim 62.

In a particular embodiment, the thickness of the shims 60, 62 is adjusted by manufacturing the shims with an oversized thickness and then grinding the shims to the desired thickness. Other method can alternately be used.

In a particular embodiment, sizing of the shim(s) 60, 62 may allow for adjusting the backlash b without significantly changing the contact pattern of the meshed teeth 48, 50/50'.

In a particular embodiment, and with the gears 40, 42 ground with a precision of 0.0002 inch, the actuating system allows for control of the angular position of the vanes 32 with a tolerance of ±0.35°.

In a particular embodiment, the actuating system allows for an increase in angular control accuracy with respect to a system using typical spur gears, which may allow for an improved operability, more consistent performances between engines, improved performances due to increased homogeneity between vanes, and/or lower risk of large vibration deviations during flutter.

The above description is meant to be exemplary only, and one skilled in the art will recognize that changes may be made to the embodiments described without departing from the scope of the invention disclosed. For example, the actuating system may be used with other types of variable vanes. Still other modifications which fall within the scope of the present invention will be apparent to those skilled in the art, in light of a review of this disclosure, and such modifications are intended to fall within the appended claims.

The invention claimed is:

1. A gas turbine engine comprising:
   a compressor in a flow path, the compressor including moveable inlet guide vanes rotatable about a respective pivot axis; and
   an actuating system drivingly connected to the moveable inlet guide vanes, the system including:
   a face gear located out of the flow path and rotationally engaged to a central support having a fixed position with respect to the compressor, the face gear rotatable about a central axis of the compressor, a radial surface of the face gear defining circumferentially spaced face gear teeth defining land surfaces,
   a pinion engaged to and extending transversely from an end of each of the vanes, each pinion having an array of involute pinion teeth spaced apart from the vane end and defining land surfaces, each pinion in meshed engagement with the face gear, wherein in a plane containing the respective pivot axis, the land surfaces of the pinion teeth are angled with respect to adjacent ones of the land surfaces of the face gear teeth meshed with the pinion teeth, a smallest axial distance between the adjacent land surfaces of the meshed pinion and face gear teeth defining a backlash of the actuating system, and
   at least one shim abutting the pinion or the face gear and having a thickness adjusting an axial distance between the pinion and the face gear to set the backlash to a predetermined value.

2. The engine as defined in claim 1, wherein the land surfaces of the face gear teeth extend within a corresponding plane perpendicular to the central axis of the compressor.

3. The engine as defined in claim 1, wherein the predetermined value corresponds to the smallest axial distance being at most 0.0002 inch at a maximum temperature experienced by the vanes during use of the compressor.

4. The engine as defined in claim 1, wherein each pinion is a spur gear and the face gear is a helical gear.

5. The engine as defined in claim 1, wherein the respective pivot axis extends at an angle with respect to a radial direction of the compressor when viewed in a plane containing the respective pivot axis and the central axis of the compressor so that the vanes are tilted, the respective pivot axis and the land surfaces of the pinion teeth being parallel.

6. The engine as defined in claim 1, wherein the pinion teeth are tapered such that the respective pivot axis and the land surfaces of the pinion teeth are non-parallel.

7. The engine as defined in claim 1, further comprising a bearing, wherein the face gear is rotationally engaged to the central support through the bearing, the at least one shim including a face gear shim extending between and in abutment with a radially extending surface of the bearing and a radially extending surface of the central support, a thickness of the face gear shim determining an axial position of the face gear.

8. The engine as defined in claim 1, wherein the at least one shim includes a pinion shim for at least one of the pinions, the pinion shim extending between and in abutment with a surface of the pinion and a surface of the vane with both surfaces extending perpendicularly to the respective pivot axis, a thickness of the pinion shim determining a position of the pinion along the respective pivot axis.

9. The engine as defined in claim 1, wherein the face gear is rotationally engaged to the central support through a bearing assembly having a radial dimension remaining constant upon application of a load on the bearing assembly.

10. A variable vane assembly for a gas turbine engine, the assembly comprising:
an array of circumferentially spaced apart vanes adapted to extend across an annular flow path, each of the vanes pivotable about a respective pivot axis extending along a longitudinal direction of the vane, the vanes each having a pivot end, the array defining a central longitudinal axis; and
an actuating system including:
a bearing assembly concentric with the array and axially spaced apart therefrom, the bearing assembly having a fixed position with respect to the array,
a face gear engaged to the bearing assembly and rotatable about the central longitudinal axis, the face gear having circumferentially spaced face gear teeth defining land surfaces extending within a corresponding plane perpendicular to the central longitudinal axis,
a pinion engaged to and extending transversely from the pivot end of each of the vanes, each pinion having an array of involute pinion teeth spaced apart from the pivot end and defining land surfaces, each pinion in meshed engagement with the face gear, wherein in a plane containing the respective pivot axis, the land surfaces of the pinion teeth are angled with respect to adjacent ones of the land surfaces of the face gear teeth meshed with the pinion teeth, a smallest axial distance between the adjacent land surfaces of the meshed pinion and face gear teeth defining a backlash of the actuating system, and
at least one shim abutting the pinion or the face gear and having a thickness adjusting an axial distance between the pinion and the face gear to set the backlash to a predetermined value.

11. The assembly as defined in claim 10, wherein the predetermined value corresponds to the smallest axial distance being at most 0.0002 inch at a maximum temperature experienced by the array of vanes during use.

12. The assembly as defined in claim 10, wherein each pinion is a spur gear and the face gear is a helical gear.

13. The assembly as defined in claim 10, wherein the respective pivot axis extends at an angle with respect to a radial direction of the array when viewed in a plane containing the respective pivot axis and the central longitudinal axis so that the vanes are tilted, the respective pivot axis and the land surfaces of the pinion being parallel.

14. The assembly as defined in claim 10, wherein the pinion teeth are tapered such that the respective pivot axis and the land surfaces of the pinion teeth are non-parallel.

15. The assembly as defined in claim 10, wherein the at least one shim includes a face gear shim extending between and in abutment with a radially extending surface of the bearing and a radially extending surface of a portion of the engine engaging the bearing, a thickness of the face gear shim determining an axial position of the face gear.

16. The assembly as defined in claim 10, wherein the at least one shim includes a pinion shim for at least one of the pinions, the pinion shim extending between and in abutment with a surface of the pinion and a surface of the vane with both surfaces extending perpendicularly to the respective pivot axis, a thickness of the pinion shim determining a position of the pinion along the respective pivot axis.

17. The assembly as defined in claim 10, wherein the bearing is a ball bearing to which a preload has been applied.

18. A variable vane assembly for a gas turbine engine, the assembly comprising:
an array of circumferentially spaced apart vanes adapted to extend across an annular flow path, each of the vanes pivotable about a pivot axis extending along a longitudinal direction of the vane, the vanes each having a pivot end, the array defining a central longitudinal axis; and
an actuating system including:
a bearing assembly concentric with the array and axially spaced apart therefrom, the bearing assembly having a fixed position with respect to the array,
a face gear engaged to the bearing assembly and rotatable about the central longitudinal axis, the face gear having circumferentially spaced teeth defining land surfaces extending within a corresponding plane perpendicular to the central longitudinal axis,
a pinion engaged to and extending transversely from the pivot end of each of the vanes, each pinion having an array of involute gear teeth spaced apart from the pivot end, each pinion in meshed engagement with the face gear, the teeth of each pinion defining land surfaces angled with respect to adjacent ones of the land surfaces of the teeth of the face gear meshed therewith, a smallest axial distance between the adjacent land surfaces of the meshed pinion and face gear teeth defining a backlash of the actuating system, and
at least one shim abutting the pinion or the face gear and having a thickness adjusting an axial distance between the pinion and the face gear to set the backlash to a predetermined value, wherein the at least one shim includes a face gear shim extending between and in abutment with a radially extending surface of the bearing and a radially extending surface of a portion of the engine engaging the bearing, the thickness of the face gear shim determining an axial position of the face gear.

19. A variable vane assembly for a gas turbine engine, the assembly comprising:
an array of circumferentially spaced apart vanes adapted to extend across an annular flow path, each of the vanes pivotable about a pivot axis extending along a longitudinal direction of the vane, the vanes each having a pivot end, the array defining a central longitudinal axis; and an actuating system including:
- a bearing assembly concentric with the array and axially spaced apart therefrom, the bearing assembly having a fixed position with respect to the array,
- a face gear engaged to the bearing assembly and rotatable about the central longitudinal axis, the face gear having circumferentially spaced teeth defining land surfaces extending within a corresponding plane perpendicular to the central longitudinal axis,
- a pinion engaged to and extending transversely from the pivot end of each of the vanes, each pinion having an array of involute gear teeth spaced apart from the pivot end, each pinion in meshed engagement with the face gear, the teeth of each pinion defining land surfaces angled with respect to adjacent ones of the land surfaces of the teeth of the face gear meshed therewith, a smallest axial distance between the adjacent land surfaces of the meshed pinion and face gear teeth defining a backlash of the actuating system, and
- at least one shim abutting the pinion or the face gear and having a thickness adjusting an axial distance between the pinion and the face gear to set the backlash to a predetermined value, wherein the at least one shim includes a pinion shim for at least one of the pinions, the pinion shim extending between and in abutment with a surface of the pinion and a surface of the vane with both surfaces extending perpendicularly to the pivot axis of the vane, the thickness of the pinion shim determining a position of the pinion along the pivot axis of the vane.

* * * * *